US006862487B2

(12) United States Patent
Yamanaka et al.

(10) Patent No.: US 6,862,487 B2
(45) Date of Patent: Mar. 1, 2005

(54) PRODUCTION METHOD AND A PRODUCTION SYSTEM

(75) Inventors: Tomoharu Yamanaka, Kuwana (JP); Yasuhiko Yamazaki, Toyota (JP); Masayuki Kitano, Toyota (JP)

(73) Assignee: Denso Corporation, Kariya (JP)

( * ) Notice: Subject to any disclaimer, the term of this patent is extended or adjusted under 35 U.S.C. 154(b) by 187 days.

(21) Appl. No.: 09/852,696

(22) Filed: May 11, 2001

(65) Prior Publication Data

US 2001/0040082 A1 Nov. 15, 2001

(30) Foreign Application Priority Data

May 15, 2000 (JP) ........................................ 2000-141735

(51) Int. Cl.[7] .............................................. G06F 19/00
(52) U.S. Cl. .............................. 700/97; 700/112; 705/8
(58) Field of Search ............................... 705/8; 700/97, 700/121, 117, 96, 106, 112

(56) References Cited

U.S. PATENT DOCUMENTS

| | | | | |
|---|---|---|---|---|
| 5,344,365 A | * | 9/1994 | Scott et al. ................. | 454/187 |
| 5,630,070 A | * | 5/1997 | Dietrich et al. ............... | 705/8 |
| 5,841,659 A | * | 11/1998 | Tanaka et al. .............. | 700/121 |
| 5,993,081 A | * | 11/1999 | Itoh et al. ................... | 396/611 |
| 6,436,471 B1 | * | 8/2002 | Petersen ..................... | 427/209 |

FOREIGN PATENT DOCUMENTS

| | | |
|---|---|---|
| JP | S62-057060 | 3/1987 |
| JP | H02-185348 | 7/1990 |
| JP | H05-023931 | 2/1993 |
| JP | H08-030689 | 2/1996 |
| JP | H08-077259 | 3/1996 |
| JP | H08-108903 | 4/1996 |
| JP | 8-155761 | 6/1996 |
| JP | H08-155761 | 6/1996 |
| JP | H09-011088 | 1/1997 |
| JP | H09-029589 | 2/1997 |
| JP | H09-290351 | 11/1997 |
| JP | 10-58358 | 3/1998 |
| JP | H11-010490 | 1/1999 |
| JP | H11-184513 | 7/1999 |
| JP | 2000-044020 | 2/2000 |

* cited by examiner

*Primary Examiner*—Albert W. Paladini
(74) *Attorney, Agent, or Firm*—Posz & Bethards, PLC

(57) ABSTRACT

Various models of brake parts (products) are produced with a mixedly transferring production system. The mixedly transferring production system includes a top line, a first production line, a second production line, and a third production line, a mixedly transferring depot, a part depot, and a set assembling line, and a product depot (mentioned in order of processing flow). Out of them, the first to third production lines, the mixedly transferring depot form the mixedly transferring block division type of production system. In addition, an averaging post and a production order plate (kanban) sorter are provided (mentioned in order of production command flow).

17 Claims, 5 Drawing Sheets

FIG. 4

PRODUCTION CMD GEN SCREEN (TRANSFERRING : GIVEN INT)  (TRANSFERRING TRIGGER : BY OPERATOR)

| MODEL | ORDER | LOW NO. PRO | STOCK A | REF B | DIFF A−B | THE NO. OF PRO | RESULT | | | | |
|---|---|---|---|---|---|---|---|---|---|---|---|
| | | | | | | | 1CY PRIOR | 2CY PRIOR | 3CY PRIOR | 4CY PRIOR | 5−7CY PRIOR INT |
| 133000−4000 | 2 | | 70 | 100 | −30 | 24 | 24 | 36 | 24 | 24 | 96 |
| 133000−4100 | 1 | 8 | 7 | 20 | −13 | 0 | 0 | 0 | 0 | 0 | 12 |
| 133000−4200 | 3 | 8 | 7 | 20 | −13 | 0 | 0 | 0 | 12 | 0 | 0 |
| 133000−4300 | 4 | 8 | 7 | 20 | −13 | 12 | 12 | 0 | 0 | 0 | 0 |
| 133000−4400 | 5 | | 80 | 75 | 5 | 0 | 0 | 0 | 24 | 0 | 24 |
| 133000−5000 | 8 | 4 | 7 | 20 | −13 | 12 | 0 | 0 | 0 | 0 | 12 |
| 133000−5200 | 7 | 4 | 7 | 20 | −13 | 0 | 0 | 12 | 0 | 0 | 0 |
| 133000−5300 | 6 | 2 | 7 | 20 | −13 | 12 | 0 | 0 | 0 | 0 | 12 |
| 133000−6000 | 9 | | 90 | 100 | −10 | 0 | 24 | 0 | 12 | 12 | 48 |
| 133000−6100 | 10 | | 85 | 100 | −15 | 12 | 24 | 36 | 24 | 24 | 96 |
| TOTAL | | | 377 | 495 | | 72 | 84 | 84 | 108 | 60 | 300 |

15:33  13:13 10:40 8:43 3:26

LOW NO. PRO 「8」: ONCE PER 8 PRO INTs, 「4」: ONCE PER PRO INTs

F1 F2 F3 F4 F5 F6 F7 F8 F9 F10

PRODUCTION METHOD AND A PRODUCTION SYSTEM

BACKGROUND OF THE INVENTION

1. Field of the Invention

This invention relates to a production method and a production system.

2. Description of the Prior Art

Production systems for successively producing works with a model-by-model transferring type of production line or a mixedly transferring type of production lines are known. In the model-by-model transferring type of production line, a production line is provided for each model. The mixedly transferring type of production line produces different models with one transferring production line.

FIG. 7A shows an example of the mixedly transferring type of the production line. In this example, it is assumed that brake parts are produced in the mixedly transferring production line. This production line successively executes processes of ball press-fitting assembling, motor-pump assembling, and solenoid assembling.

In this production system using a transferring type of production line, though production command is simple, a rate of operation in producing the work showing tact difference (time difference between respective processes) tends to be low. Moreover, the whole of the production line may stop when a severe trouble occurs at only a portion of the production line. Further, the rate of operation in producing a product is unstable and all processes may be affected by a neck process.

Another production system using block division type (Job Shop type) of production lines is known.

This production system includes independent production lines provided for respective processes such as the ball press-fit assembling, the motor-pump assembling, and the solenoid assembling. Thus, different processes are made at respective production lines, so that this production system is suited for producing a plurality of types of products in parallel.

In this block division type of production line, the operation interval can be adjusted every block unit (process) and modification of the system is possible every block unit. However, because these production lines are provided for producing a plurality of types of products, complicated production controlling is required. Thus, it is difficult to make the production commands for respective production lines.

More specifically, in the mixedly transferring block division type of production lines, the operator should make a production command every production line in consideration of tact differences, averaging the operation time of respective lines, calculating operation time, absorbing deviation in the number of requested products, and real time management of stocked products. This is very difficult.

FIG. 7B shows the processes in the mixedly transferring block division type of production lines. As shown in FIG. 7B, transferring a work from the previous process to another process is complicated every production line. That is, there are more than one previous or post processes for an intermediate line. In other words, an intermediate line has relation with more than one previous lines or post lines.

Moreover, to smoothly make process at each line, it is necessary to stock works to be processed at every production line. Thus, there is tendency that the number of stocked works increases in the prior art production lines.

SUMMARY OF THE INVENTION

The aim of the present invention is to provide a superior production method and a superior production system.

According to the present invention, a first aspect of the present invention provides a method of mixedly producing a plurality of types of works with a block division type of production system including production lines arranged in parallel, each effecting a predetermined process, said method comprising the steps of: (a) dividing requests for a plurality of types works in a production unit on the basis of production timings in the case that a plurality of types of works are produced; (b) obtaining the number of lots of each type of said works at each production timing and supplying the number of lots of each type of said works at each production timing as a division production command to said first production line; and (c) at each of said production lines, storing said lots of each type of said works processed at each of said production line in a mixedly transferring depot; and (d) at one of production lines following to each of said production line, generating a production plan on the basis of the number of lots of each type of said works stored in said mixedly transferring depot, and processing said lots of each type of said works on the basis of said plan.

According to the present invention, a second aspect of the present invention provides a method based on said first aspect, wherein in said step (a), said requests are divided on the bases of a divided interval or the divided number of a plurality of works.

According to the present invention, a third aspect of the present invention provides a method based on the first aspect, wherein, in said step (b), a difference between the number of lots of each type of said works outputted from said block division type of production system and a reference is obtained, and said division production command is determined on the basis of said difference of each type of said works.

According to the present invention, a fourth aspect of the present invention provides a method based on the first aspect, wherein said works outputted from said block division type of production system are stored in a part depot.

According to the present invention, a fifth aspect of the present invention provides a method based on the first aspect, wherein, if the number of said works in a lot of each type of said works is lower than the predetermined number, each of said production lines continues to process said lot of each type of said works and said mixedly transferring depot also continues to receive and outputs said lot of each type of said works.

According to the present invention, a sixth aspect of the present invention provides a method based on the first aspect, wherein said production plan is generated by counting each lot of each type of said works one by one recurrently among said plurality of types of said works and when the count reaches a predetermined number, said production plan is generated in accordance with the counted number.

According to the present invention, a seventh aspect of the present invention provides a method based on the first aspect, wherein in step (b), when the number of one type of said works in a production unit is lower than a reference, said division production command is supplied only at a part of said production timings.

According to the present invention, an eighth aspect of the present invention provides a production system for mixedly producing a plurality of types of works with a block division type of production system including production lines arranged in parallel, each effecting a predetermined process, comprising: a first floor supporting said production lines; a second floor of which height is different from that of said first floor to provide passages for human beings and works; and moving means for upwardly and downwardly moving said works between said first and second floors.

According to the present invention, a ninth aspect of the present invention provides a production system based in the eight aspect, further comprising transferring means arranged on said second floor for transferring said work from said moving means.

According to the present invention, a tenth aspect of the present invention provides a production system based on the ninth aspect, wherein said transferring means comprises a monorail and carriers moving on said monorail.

According to the present invention, an eleventh aspect of the present invention provides a production system based on the eighth aspect, further comprising a mixedly transferring depot for storing a plurality of types of works from said production lines.

According to the present invention, a twelfth aspect of the present invention provides a production system based on the eleventh aspect, wherein said mixedly transferring depot is arranged near said second floor.

According to the present invention, a thirteenth aspect of the present invention provides a production system based on the twelfth aspect, wherein said mixedly transferring dept is higher than said second floor.

According to the present invention, a fourteenth aspect of the present invention provides a production system based on the eighth aspect, wherein works transferred by said production lines and said moving means are transferred with a container containing a predetermined number of said works.

According to the present invention, a fifteenth aspect of the present invention provides a production system based on the fourteenth aspect, wherein said container has first identification data indicating the done processes and second identification data indicating the next process.

BRIEF DESCRIPTION OF THE DRAWINGS

The object and features of the present invention will become more readily apparent from the following detailed description taken in conjunction with the accompanying drawings in which:

FIG. 4 is a table of production command generating image;

The same or corresponding elements or parts are designated with like references throughout the drawings.

DETAILED DESCRIPTION OF THE INVENTION

Figure 1:
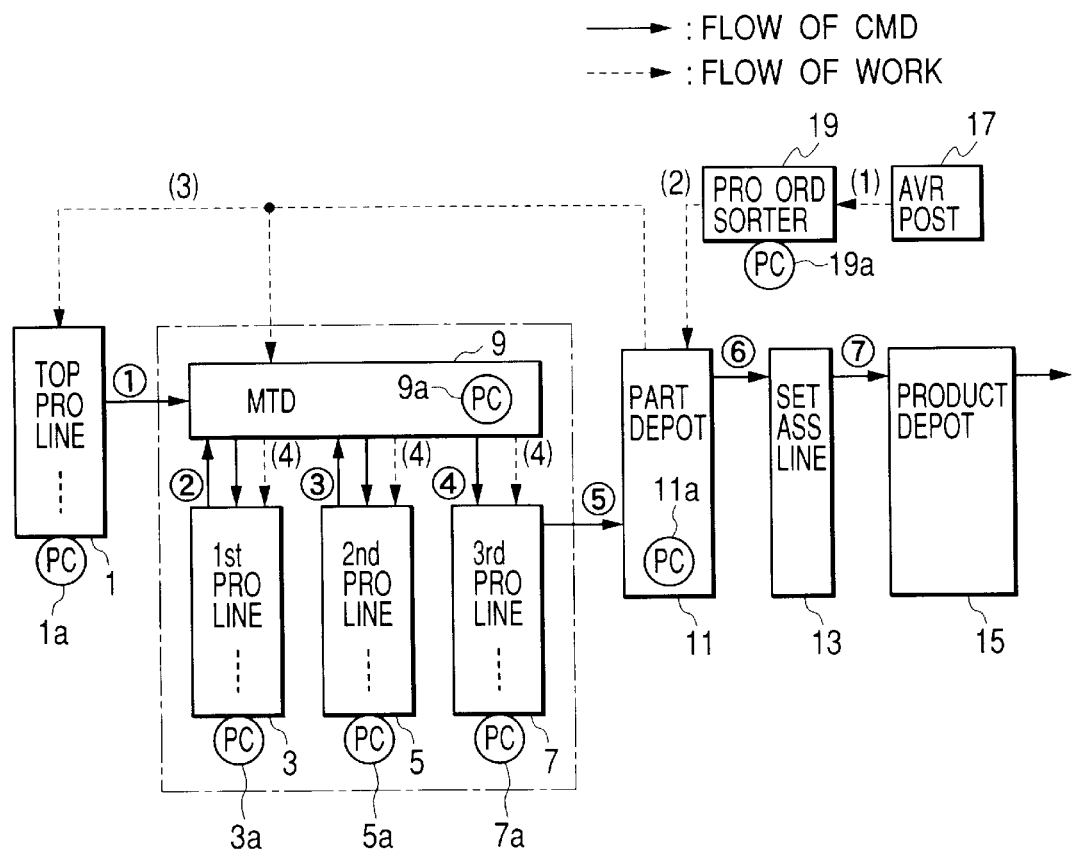
FIG. 1 is a block diagram of a production system according to an embodiment of the present invention.

Hereinbelow will be described an embodiment of a method of producing works and a production system according to this invention.

In this embodiment, it is assumed that brake assemblies such as a brake part for a hydraulic circuit including a pump or a solenoid, etc. are produced.

a) At first, the whole of production process will be described. Brake parts (works) are produced with a mixedly transferring production system wherein different types (models) of brake parts are produced.

This mixedly transferring production system includes a top production line 1, a first production line 3, a second production line 5, a third production line 7, mixedly transferring depot 9, a part depot 11, a set assembling line 13, and a product depot 15 (mentioned in order of transferring works).

Out of them, a mixedly transferring block division type of production system (mentioned later) is provided with the first production line 3, the second production line 5, the third production line 7, and the mixedly transferring depot 9. Moreover, the top production line 1 may be considered as a part of the mixedly transferring block division type of production system.

The mixedly transferring production system further includes an averaging post 17 and a production order plate sorter 19 (mentioned in order of production order flow).

The top production line 1 is provided for first process to a base material. For example, sheet-press or drilling process to have a slant hole is effected.

The first production line 3 is a ball-fit-process block. For example, a ball is fitted at a predetermined point at the base material subjected to the sheet press with the ball-fit-press.

The second production line 5 is a motor assembling block. For example, a motor is assembled with the base material subjected to the ball-fit-press.

The third production line 7 is a solenoid-assembling block. For example, a solenoid for an electromagnetic valve is fixed at a predetermined position of the base material to which the pump motor is fixed.

The mixedly transferring depot 9 is an intermediate depot for temporarily storing the works (stock works) necessary for the first production line 3 to the third production line 7. The mixedly transferring depot 9 supplies the brake parts to be processed to the respective production lines 3 to 7 and stores the brake parts from the respective production lines 1 to 5.

Figure 2:
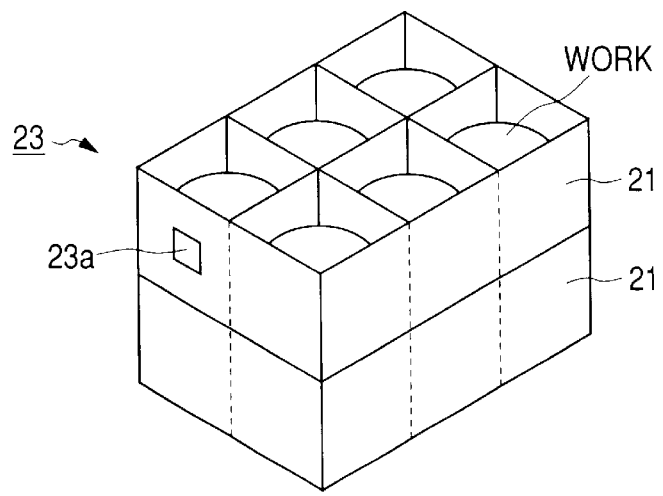
FIG. 2 is a perspective view of a container used in this embodiment.

The works processed in each of production lines 1 to 7 are contained in a box 21 containing six brake works as shown in FIG. 2. Two boxes 21 are piled as a (lot unit) container 23 which is transferred between the respective production lines 1 to 7.

An identification (ID) plate 23a, which is a magnetic recording unit for example, is a fixed to the container 23. The identification plate 23a records finished processes, that is, the line identification number of the production line outputting the works and the next process number, that is, the production line identification number receiving the works.

Now return to FIG. 1, the part depot 11 stores the brake parts, that is, the finished brake works, supplied from the third production line 7.

The set assembling line 13 is supplied with a brake part from the part depot 11, and the brake part is fixed a predetermined location of the brake assembly.

The product depot 15 stores the products, that is, the finished brake assemblies. The products from the product depot 15 are shipped with trucks or the like.

The averaging post 17 includes a plurality of posts to distribute the production order plates (so-called kanban in Japan) to respective posts. For example, if a daily unit production interval is divided into eight intervals, the production order plates are substantially evenly distributed to eight posts. Also if a production unit, i.e., the number of products per day, is divided into eight sets, the production order plates are also distributed to eight posts substantially evenly.

The production order plate sorter 19 recognizes and detects a plurality of production order plates distributed in one of posts and counts the number of each model (type) of the brake parts or counts the number of production brake parts indicated by the production order plates.

b) Next, a controlling system for controlling the production system will be described.

A main computer controls the system mentioned above. In addition, a personal computer is provided to each production line for effecting control necessary for the process.

For example, as shown in FIG. 1, a sorter personal computer 19a reads the number of production requests from the production order plates. At the part depot 11, a part depot personal computer 11a supplies production orders at each timing of eight division production intervals from the signal from the sorter personal computer 19a and the stock in the part depot 11.

At the mixedly transferring depot 9, a mixedly transferring depot personal computer 9c controls the model number of the brake parts (works) inputted or outputted and controls the containers 23 inputted or outputted.

At production lines 1 to 7, production line personal computers 1a to 7a control the number of or model numbers of the brake parts (works) inputted or outputted, respectively.

c) Next, the mixedly transferring block division type system will be described more specifically.

Figure 3A:
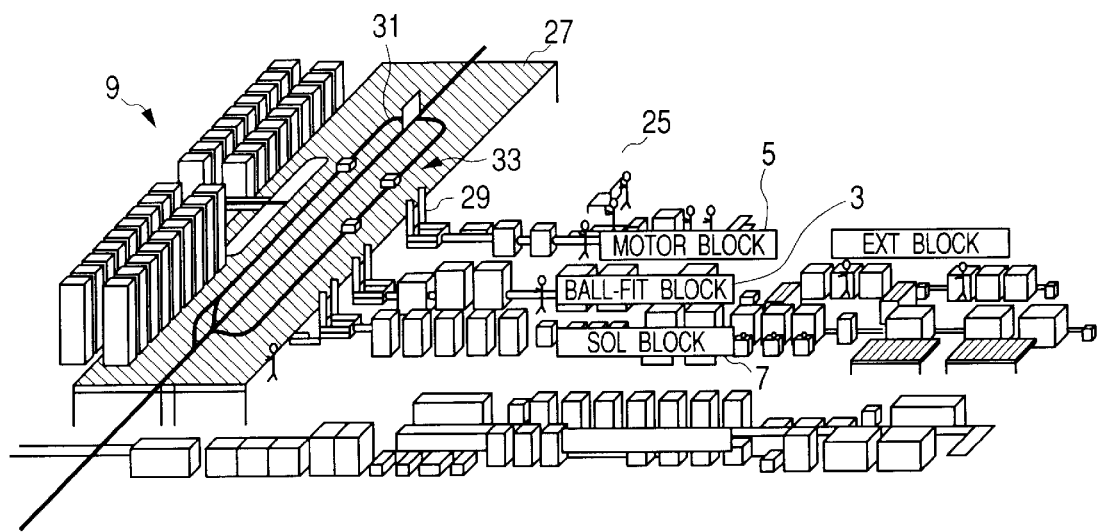
FIGS. 3A and 3B are perspective views of portions of the production system according to this embodiment.
Figure 3B:
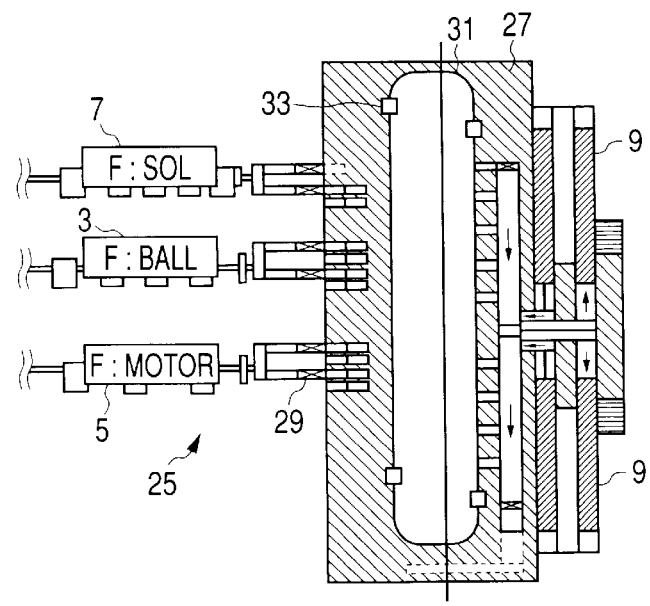

FIG. 3A is a perspective view of the mixedly transferring block division system. This system includes the first to third production lines 3 to 7 arranged in parallel on the first floor 25 and a transferring floor 27 at the second floor. The transferring floor 27 (longitudinal direction) is arranged perpendicularly to the respective production lines 3 to 7.

This structure enables that operators and various parts that are not necessary to be lifted to the second floor are freely movable on the first floor 25 without disturbance by the transferring floor 27.

Between each of the production lines 3 to 7 and the transferring floor 27, a lift 29 is arranged to lift up and down a container 23 including a lot of brake parts. Further, a monorail 31 is circularly arranged on the transferring floor 27. A plurality of carriers 33 are provided on the monorail 31, each carries the container 23 including a lot of works at a relative high speed.

Further, a mixedly transferring depot 9 is provided near the transferring floor 27 on the opposite side of the respective production lines 3 to 7 with upwardly extending above the transferring floor 27. The mixedly transferring depot 9 includes shelves, each storing one container 23 including one lot of brake parts and inputs and outputs the brake parts with each container 23 by the carrier 33.

Thus, it is possible to input or output brake parts processed or to be processed at the respective production lines 1 to 7 in or from the mixedly transferring depot 9 with the lifts 29 and carriers 33 on the monorail 31. Particularly, in this embodiment, at every finishing process at each of production lines 1 to 5, the container 23 including one lot of parts is once stored in the mixedly transferring depot 3.

The top production line 1 is arranged separately from the other production lines 3 to 7 as shown in FIG. 1. However, the top production line 1 may be arranged in parallel to the other production lines 3 to 5 with the same lift 29. Alternatively, the top production line 1 may have one-direction structure, that is, the top production line 1 only transfers the brake parts to input parts into the mixedly transferring depot 9.

d) Next, a method of production with the production system mentioned above will be described.

(1) Averaging (Distributing) Process

When a lot of production order plates corresponding to model numbers or the number of brake parts for production are sent to the works from the external, the production order plates are averaged with the averaging post 17. That is, the production order plates (requests) are evenly distributed to respective posts.

Here, it is assumed that the number of new production orders is supplied to the top production line 1 every predetermined interval. For example, if the total production interval of the works per day is 16 hours and is divided into eight division production intervals, the production order is made every two hours (division production interval). Therefore, eight posts are prepared.

A lot of production order plates are successively distributed to eight posts one by one. Then, (if there are sufficient production order plates), the model numbers or the number of production of the brake parts indicated by the production plates in each post is substantially averaged.

Thus, checking the production order plates in each post provides the model numbers or the number of production of the brake parts to be produced during the division production interval. In this case, any post can be used because each post includes substantial the same orders because of the distribution.

(2) Sorting Process

The main computer selects one from the eight posts and supplies the production order plates in the selected post to the production order plate sorter 19.

The sorter personal computer 19a reads data in the order production plates and stores the data in the memory thereof. That is, the sorter personal computer 19a reads the model numbers and the number of brake parts to be produced during one of eight predetermined division production intervals and stores the data and calculates the total production number of the division production interval.

The sorter personal computer 19a supplies the data of the model numbers (the number indicating the type of the brake part) and the number of each type of products to the part depot personal computer 11a.

Alternatively, if the production order plates are not used, for example, the total number of products a day is supplied, the number of products (unit production) may be divided into eight sets, and one set may be supplied to the top production line 1.

(3) Production Ordering (Command) Process for the Top Production Line

The part depot personal computer 11a sets the number of products to be outputted, that is, the number of ordered products, to the top production line 1 and the mixedly transferring depot 9 with the data of the model numbers and the number of parts from the sorter personal computer 19a and the number of parts stored in the part depot 11.

This is so-called post supplement type of production ordering in which the top production line 1 or the like is informed of the lack of the products.

Figure 5A:
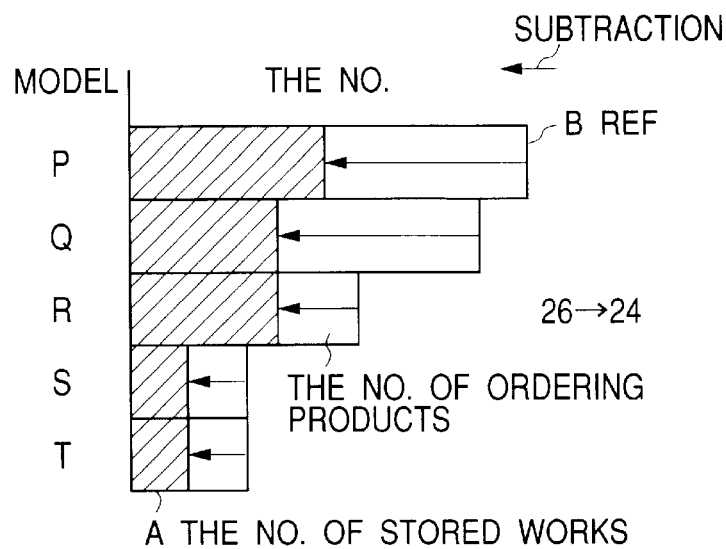
FIGS. 5A and 5B are illustrations of subtraction and counting operations according to this embodiment.

FIG. 4 shows a production order (command) generating screen image on the display for the part depot personal computer 11a. As shown in FIG. 5A, the part depot personal computer 11a obtains difference between the reference B and the number A of the stored parts of each model number (type), and determines the maximum multiple of twelve (the number of works in the container 23) within an absolute value of the difference, i.e., |A–B|, as the number of ordered products for the present division production interval. For example, if the difference is 26, the number of ordered products is 24 (two lots).

More specifically, in FIG. 5A, if reference numbers B (right ends on the drawing) of the model numbers P, Q, R, S, T, are set, absolute values of the differences (B–A) are shown as non-hatched bar portions in the drawing. The number of the ordered products for each type is given by the maximum multiple of twelve which is lower than the absolute of difference.

Figure 5B:
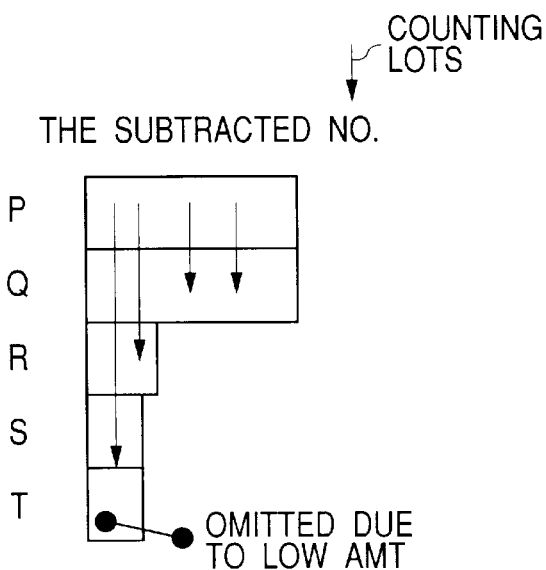

FIG. 5B shows differences in order of the values of the differences. The products of each model number are counted in the vertical direction in the drawing at the unit of one lot. That is, at first, one lot of the model number P is counted, next, one lot of port number Q is counted, next, one lot of the part number R is counted, and one lot of part number S is counted. The next part number T is a few, that is, the number of the parts is lower than twelve, so it is not counted now. Next, one lot of the part number P is counted again. This operation is repeated until the total reaches the division interval total production number calculated by the sorter personal computer 19a. That is, counting each lot of each type of said works one by one recurrently among said plurality of types of said works. When the count reaches a predetermined number, said production plan is generated in accordance with the counted number.

Next, the number of lots of each model number obtained by this vertical direction counting is set to the top production line personal computer 1a for the present division production interval as production order number.

The number of products of each model number obtained as mentioned above is supplied to the top production line personal computer 1a and to the mixedly transferring personal computer 9a at every predetermined division production interval. Here, in this example, the command for supplying the number of product of each model number is made through checking the present time by the operator. However, this may be made automatically every predetermined interval.

Here, each reference number B is a value that is slightly higher than the number of products of each model number. The reason why the number of products of each model number is determined from the multiple of twelve is that twelve of products correspond one lot and in this embodiment, production is managed at a unit of lot.

Moreover, as shown in FIG. 4, in this embodiment, the parts produced at a relative small number are not produced at all division production intervals but are produced at a portion of division production intervals in accordance with the number of products. That is, the parts produced at a small number are produced every predetermined number of division production interval in accordance with the number of products.

For example, "8" in the section of a low number production indicates that products of this model number are produced once in eight division production intervals. "4" in the section of low number production indicates that products of this model number are produced once in four division production intervals. "2" in the section of low number production indicates that products of this model number are produced once in two division production intervals.

(4) Process at the Top Production Line

The top production line 1 effects the first production process on the basis of the data of the model number and the number of products of each model number supplied from the part depot personal computer 11a to the top production line personal computer 1a.

More specifically, base materials that are the first materials for producing the brake part are successively prepared. The number of the base materials agrees with the number of the ordered products of each model number. A first process such as sheet press or drilling a slant hole is performed.

Here, brake parts of each model number are processed at a unit of twelve parts, that is, at a lot. Thus, the processed brake parts are contained in the container 23 every model number and the processed parts are transferred to the mixedly transferring depot 9 at one lot.

For example, if twenty-four the brake parts P are produced, two lots of brake parts P are produced and two containers 23 containing twenty-four brake parts P are transferred to the mixedly transferring depot 9. Here if one brake part is inferior, one container 23 contains only twenty-three brake parts. However, transferring these two containers 23 to the mixedly transferring depot 9 is continued as they are. That is, one container containing only twenty-three brake parts is transferred to the mixedly transferring depot 9 with the other container including twenty-four brake parts.

The ID plate 23a on a container 23 records finished process IDs indicating the finished processes and the next process ID indicating the next process, and the data regarding this container 23 is stored in the mixedly transferring personal computer 9a when the container 23 is carried in the mixedly transferring depot 9.

(5) Process of the First Production Line

The first production line 3 is provided for effecting the ball press-fitting assembling. The first production line personal computer 3a generates a production plan every division production interval by checking the brake parts presently stored in the mixedly transferring depot 9.

More specifically, in the mixedly transferring depot 9, the container 23 having the ID plate recording the next process ID is stored and the data in the ID plate is stored in the mixedly transferring personal computer 9a. Thus, the first production line personal computer 3a reads the data from the ID plates 23a to make a production plan.

Figure 6:
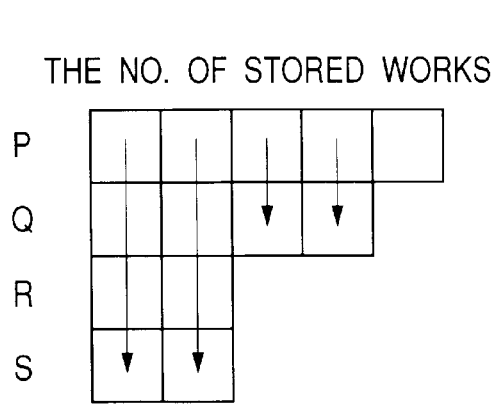
FIG. 6 is an illustration of counting operation for stored works according to this embodiment.
Figure 7A:
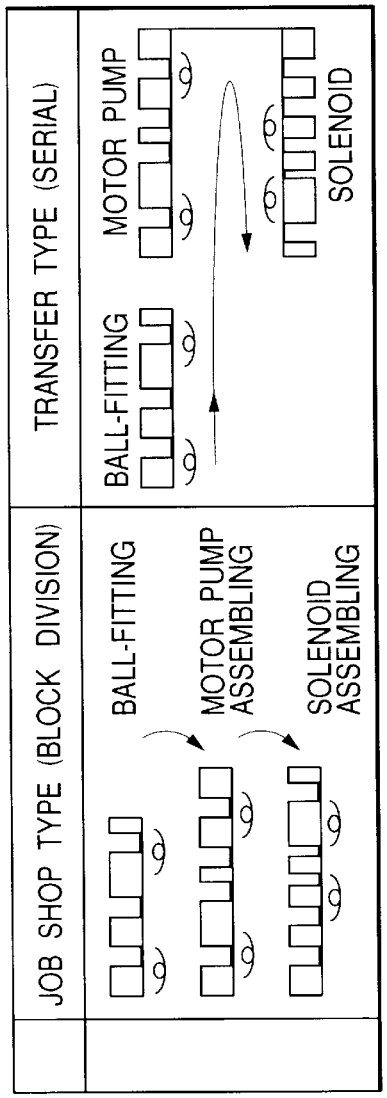
FIG. 7A is an illustration of a prior art production systems.
Figure 7B:
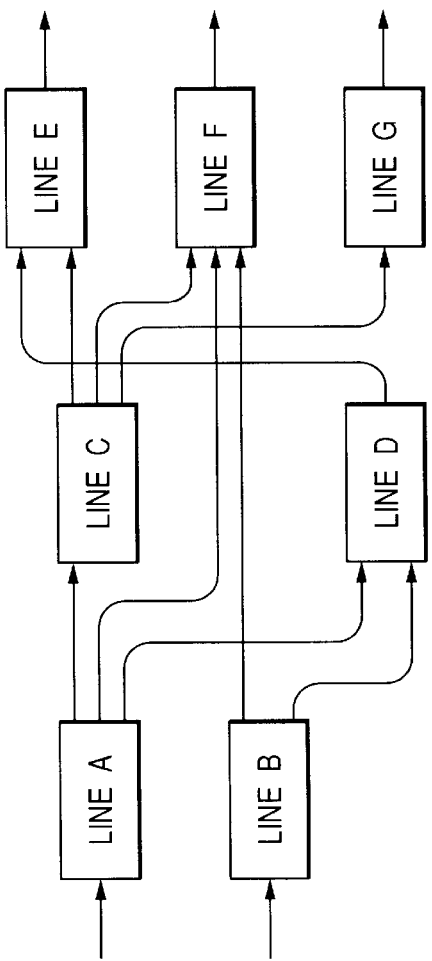
FIG. 7B is an illustration of a prior art production system.

It is assumed that the data in the mixedly transferring depot personal computer 9a indicates brake parts to be transferred into the first production line 3 as shown in FIG. 6. The first production line personal computer 3a successively counts the number of lots in the same manner as FIG. 5B shows. That is, the first production line personal computer 3a counts lots shown in FIG. 6 in the vertical direction in the drawing every model number until the count reaches the number of lots which can be processed within the present division production interval. The counted brake parts of each model number are processed in the first production line 3.

As mentioned above, the number of lots of each model number to be processed is determined. Next, the first production line 3 determines order of transferring the containers 23 from the mixedly transferring depot 9.

For example, if the order of production is the model number P, the model number Q, the model number R, and the model number S, at first, each lot of model P is repeatedly carried from the mixedly transferring depot 9 until the number of the lots reaches a predetermined number. In the same way, each lot of another same model is repeatedly carried because the workability will decrease if different models of brake parts are processed every lot.

When the production plan is generated as mentioned above, the first production line personal computer 3a commands the mixedly transferring depot personal computer 9a to move the carrier 33 on the monorail 31.

In response to this, containers 23 containing brake parts to be processed next are transferred to the top of the lift 29 for the first production line 3 at a lot unit from the mixedly transferring depot 9, are lifted down to the first production line 3 with the lift 29, and are successively subjected to the ball press-fitting process.

The brake parts which have been subjected to the ball-fitting process of each model number are contained in containers 23.

Next, the containers 23 are lifted up to the transferring floor 27 with the lift 29 and are loaded on the carrier 33 to be transferred to the mixedly transferring depot 9. Before transferring the container 23, the finished process ID and next process ID are recorded on the identification plate 23a in each container 23.

If some inferior brake parts are developed, there is the container containing brake parts of which the number is lower than twelve. However, such a container 23 is transferred to the mixedly transferring depot 9 with lack (the lack is neglected). That is, the inferior brake parts are only removed.

(6) Process in the Second Production Line

The second production line 5 is provided for motor assembling and, in the same manner as the first production line 3, generates a production plan through checking the brake parts currently stored in the mixedly transferring depot 9 at every division production interval.

More specifically, the second production line personal computer 5a reads the data of the containers 23 to be processed by the second production line 5 in the mixedly transferring depot personal computer 9a and generates the production plan in the same manner as the first production lien 3.

Next, the brake parts transferred from the mixedly transferring depot 9 are subjected to the motor assembling process on the basis of the production plan. The brake parts which have been subjected to the brake assembling process are contained in the containers 23 every model number in the same manner as the first production line 3.

Next the finished process ID and the next process ID are recorded on the ID plate 23a of each container 23 in the same manner as the first production line 3 and are transferred to the mixedly transferring depot 9 again.

Here, if some inferior brake parts are developed in the process, there is the container containing brake parts of which the number is lower than twelve. However, such a container 23 is transferred to the mixedly transferring depot 9 with lack of the inferior brake parts. That is, the inferior brake parts are only removed.

(7) Process in the Third Production Line

The third production line 7 is provided for solenoid assembling and, in the same manner as the first production line 3, generates a production plan through checking the brake parts to be subjected to this process and currently stored in the mixedly transferring depot 9 at every division production interval.

More specifically, the third production line personal computer 7a reads the data of the containers 23 in the mixedly transferring depot personal computer 9a and generates the production plan in the same manner as the first and second production lines 3 and 5.

Next, the brake parts transferred from the mixedly transferring depot 9 are subjected to the solenoid assembling process on the basis of the production plan. The brake parts which have been subjected to the solenoid assembling process are contained in the containers 23 every model number and transferred to the part depot 11 because the processed parts are finished works.

(8) Process in the Part Depot

In the part depot 11, the part depot personal computer 11a checks the model number and the number of the transferred brake parts to store the data therein and stores the finished brake parts in the part depot 11.

(9) Process in the Set Assembling Line

The set assembling line 13 is supplied with the finished brake parts from the part depot 11 and assembles the brake part at a predetermined place of a brake unit.

The brake unit is supplied to a product depot 15.

(10) Process in the Product Depot

The product depot 15 stores the finished units, i.e., the brake unit, from the set assembling line 13, and the brake units are transferred from this product depot 15 with trucks or the like.

As mentioned above, according to this embodiment, the production command (order) at lot unit is supplied to the top production line 1 of the mixedly block division type system from the post process at every division production interval. In the mixedly block division type of system, the parts stored in the mixedly transferring depot 9 at the lot unit is checked every division production interval to generate the production plan at lot unit at every production line.

This structure operates respective production lines of the mixedly transferring block division type of production system such as a series line. Thus, the simple production command from the post process to the top process enables to product a lot of model numbers of parts with mixedly transferring.

Moreover, each of the production lines automatically generates the production plan on the basis of the parts stored in the mixedly transferring depot 9 in a unit of lot. Thus, it is easy to make the production.

In other words, the mixedly transferring depot 9 can be used as a buffer in the production processes, so that it is enough to process only brake parts stored in the mixedly transferring depot without affection from the preceding and post processes. Thus, it is easy to make the production plan.

Moreover, the production command to the top production line 1 or generating the production plan in each production lines 3 to 7 are made at a unit of lot. Though a container 23 includes processed parts of which the number is lower that twelve (lot unit), insufficiency is neglected and the parts in the container 23 is successively subject to the next process with lack. Thus, the processing is not interrupted by an inferior part generated in the process. Accordingly, the workability can be improved.

This embodiment is provided by combining the mixedly transferring block division type of production system, which is suited for producing a lot of models, with the post supplemental system in which the top production line is informed of the lack in the post process. Further, the processing and transferring are made at lot unit and the production plan is automatically made in each production line by checking parts to be processed in the mixedly transferring depot 9. Thus, this structure utilizes both features, that is, the feature of the post supplemental system in which it is easy to make production commands, and the feature of the mixedly transferring block division type of production system which easily absorbs the tact difference and is suited for mixedly transferring production of a lot of models. Thus, this combination provides an extremely favorable production system.

In this embodiment, the number of brake parts processed at each production line is not strictly controlled, so that there is dispersion in the number of the produced parts. However, the sufficient number of brake parts can be produced for a considerable long interval. Accordingly, the number of parts in the production command may be made slightly greater than that actually required for example.

In this embodiment, at each production line, only parts in the containers 23 stored in the mixedly transferring depot 9 are produced, so that unnecessary stock is not generated.

Moreover, in this embodiment, the first to third production lines 3 to 7 are arranged on the first floor 25, and the monorail 31 and the mixedly transferring depot 9 are arranged on the second floor, that is, transferring floor 27, with separation.

This structure provides free movement of operators and the works on the first floor without disturbance by the transferring brake parts. Thus, the workability is improved.

Moreover, each of production lines 3 to 7 is equipped with the lift 29 to transfer parts to or from the transferring floor 27 and the production lines are arranged in parallel to each other. Thus, it is easy to provide a new production line and it is easy to expand the mixedly transferring depot 9 and the transferring floor 27. Thus, the flexibility in structure is relatively high.

This invention is not limited by the scope of the above-mentioned embodiment but can be embodied in various modifications within the scope of this invention.

(1) For example, in this embodiment, a unit production interval is divided into eight division production intervals. When it becomes start of the division production interval, the next production command to the top production line is generated and the production plans are made. Alternatively, the number of products per a day is divided into eight sets for example. When the number of products reaches the number of division products, the number of products in the next set is set to the top production line or the production plans at respective production lines are made.

Further, it is possible to change between the interval division and division in the number of products at will.

(2) Moreover, if the number of products on a day is low, the assumed number of productions per day may be set and the number of the productions at one division may be set on the basis of the assumed the number of products. This is referred to as compulsory averaging.

What is claimed is:

1. A production system for producing a plurality of mixed types of work pieces with a block division type of production system including production lines arranged in parallel, each effecting a predetermined process, comprising:

a first floor supporting said production lines and passages for human beings;

a second floor for receiving intermediate work pieces corresponding to a plurality of types of said work pieces from said first floor and supplying said intermediate work pieces to said first floor, wherein the height of said second floor is different from that of said first floor to enable said human beings and intermediate work pieces at said first floor to move; and moving means for upwardly and downwardly moving said work pieces between said first and second floors, one of said production lines outputting said work pieces from said intermediate work pieces;

transferring means arranged on said second floor for transferring said intermediate work pieces from said moving means to enable said intermediate work pieces at each of said production lines to be transferred to the following production line;

a transferring depot for storing a plurality of mixed types of intermediate work pieces from said production lines.

2. The production system as claimed in claim 1, wherein said transferring means comprises a monorail and carriers moving on said monorail.

3. The production system as claimed in claim 1, wherein said transferring depot is arranged near said second floor.

4. The production system as claimed in claim 3, wherein said transferring dept is higher than said second floor.

5. The production system as claimed in claim 1, wherein said intermediate work pieces are transferred by said production lines and said moving means transfers said intermediate work pieces with a container containing a predetermined number of said intermediate work pieces.

6. The production system as claimed in claim 5, wherein said container has first identification data indicating completed processes and second identification data indicating a subsequent process.

7. The production system as claimed in claim 1, further comprising:

dividing means for dividing requests for a plurality of types said work pieces in a production unit including a total of said work pieces to be produced in a day by the number of production periods in a day;

obtaining means for obtaining the number of lots of each type of said work pieces at each production period and supplying the number of lots of each type of said work pieces at a start of each production period as a division production command to a top of said production line;

storing means at each production line for storing said intermediate work pieces processed at each production line, other than aid one of said production lines outputting said work pieces, in a transferring depot; and plan generation and processing means at each production line for generating a production plan on the basis of the number of lots of each type of said intermediate work pieces stored in said transferring depot and for processing said intermediate work pieces on the basis of said plan.

8. The production system as claimed in claim 7, wherein said dividing means divides said requests on the bases of the divided number of a plurality of said work pieces.

9. The production system as claimed in claim 7, wherein said obtaining means obtains a difference between the number of lots of each type of said work pieces outputted from said block division type of production system and a reference, and said division production command is determined on the basis of said difference of each type of said work pieces.

10. The production system as claimed in claim 7, further comprising storage means or storing said intermediate work pieces outputted from said block division type of production system in a part depot as said work pieces.

11. The production system as claimed in claim 7, wherein, if the number of said intermediate work pieces in a lot for each type of said work pieces is lower than the predetermined number of said work pieces in each lot, each of said production lines continues to process said lot of each type of said intermediate work pieces and said transferring depot also continues to receive and outputs said lot of each type of said work pieces.

12. The production system as claimed in claim 7, wherein said production plan is generated by counting each lot of each type of said intermediate work pieces one by one recurrently among said plurality of types of said work pieces and, when the count reaches a predetermined number, said production plan is generated in accordance with the counted number.

13. The production system as claimed in claim 7, when the number of one type of said work pieces in said production unit is lower than a reference, said obtaining means supplies said division production command only at a part of said production periods.

14. A production system comprising:
- a block division type of production system for producing a plurality of mixed types of work pieces, said production system including production lines arranged in a parallel manner, each effecting a predetermined process;
- a first floor supporting said production lines and for providing passages for human beings;
- a second floor for receiving intermediate work piece corresponding to a plurality of types of said work pieces from said first floor and for supplying said intermediate work pieces to said first floor, wherein the height of said second floor is different from that of said first floor to enable said human beings and intermediate work pieces at said first floor to move freely;
- moving means for upwardly and downwardly moving said work pieces between said first and second floors, one of said production lines outputting said work pieces from said intermediate work pieces; and
- transferring means arranged on said second floor for transferring said intermediate work pieces from said moving means to enable said intermediate work pieces at each of said production lines to be transferred the following production line.

15. The production system as claimed in claim 14, further comprising a transferring depot for storing a plurality of mixed types of intermediate work pieces from one of said production lines and supplying a plurality of types of itermediate work pieces to the following one of said production lines.

16. A production system comprising:
- parallel production lines, each effecting a predetermined process for producing work pieces;
- a first floor that supports said production lines and provides passages for human beings;
- a second floor for receiving intermediate work pieces corresponding to a plurality of types of said work pieces from said first floor and for supplying said intermediate work pieces to said first floor, wherein the height of said second floor is different from that of said first floor to enable said human beings and intermediate work pieces at said first floor to move;
- moving means for upwardly and downwardly moving said work pieces between said first and second floors; and
- transferring means arranged on said second floor to extend in a direction that is perpendicular to said production lines for transferring said intermediate work pieces from said moving means to enable said intermediate work pieces at each of said production lines to be transferred to a subsequent production line.

17. The production system as claimed in claim 16, further comprising a transferring depot for storing a plurality of mixed types of intermediate work pieces from said production lines.

* * * * *